US012505949B2

(12) United States Patent
Schliewe et al.

(10) Patent No.: US 12,505,949 B2
(45) Date of Patent: Dec. 23, 2025

(54) COIL ELEMENT

(71) Applicant: TDK Electronics AG, Munich (DE)

(72) Inventors: Jörn Schliewe, Steinheim (DE); Stefan Weber, Munich (DE)

(73) Assignee: TDK Electronics AG, Munich (DE)

( * ) Notice: Subject to any disclaimer, the term of this patent is extended or adjusted under 35 U.S.C. 154(b) by 734 days.

(21) Appl. No.: 17/636,002

(22) PCT Filed: May 4, 2021

(86) PCT No.: PCT/EP2021/061659

§ 371 (c)(1),
(2) Date: Feb. 16, 2022

(87) PCT Pub. No.: WO2021/239403

PCT Pub. Date: Dec. 2, 2021

(65) Prior Publication Data

US 2022/0406516 A1 Dec. 22, 2022

(30) Foreign Application Priority Data

May 29, 2020 (DE) ......................... 102020114516.0

(51) Int. Cl.
*H01F 27/28* (2006.01)
*H01F 27/24* (2006.01)
*H01F 27/32* (2006.01)

(52) U.S. Cl.
CPC ......... *H01F 27/2847* (2013.01); *H01F 27/24* (2013.01); *H01F 27/323* (2013.01); *H01F 2027/2857* (2013.01)

(58) Field of Classification Search
CPC .... H01F 27/2847; H01F 27/24; H01F 27/323; H01F 2027/2857; H01F 17/043; H01F 27/25
See application file for complete search history.

(56) References Cited

U.S. PATENT DOCUMENTS 3,068,433 A * 12/1962 Wroblewski ........... H01B 3/002 336/83
3,163,839 A * 12/1964 Zack ......................... H01F 5/00 336/205
3,602,745 A * 8/1971 Davis ................... H02K 41/025 310/13

(Continued)

FOREIGN PATENT DOCUMENTS

CN 103680825 A 3/2014
CN 111180173 A 5/2020

(Continued)

*Primary Examiner* — Mang Tin Bik Lian
(74) *Attorney, Agent, or Firm* — Slater Matsil, LLP

(57) ABSTRACT

In an embodiment a coil element includes a first core element and a first winding body arranged around a winding carrier part of the first core element with a winding axis, wherein the first winding body includes a first film conductor element and the first film conductor element includes a plurality of conductor films stacked on top of each other along a stacking direction and arranged electrically insulated from each other, wherein the stacking direction is parallel to the winding axis, and wherein the first core element includes a plurality of windings of the first film conductor element arranged in a spiral around the winding axis.

16 Claims, 5 Drawing Sheets

(56) References Cited

U.S. PATENT DOCUMENTS

| | | | | |
|---|---|---|---|---|
| 4,212,932 | A | 7/1980 | Calgari et al. | |
| 6,252,487 | B1 | 6/2001 | Wolf et al. | |
| 6,985,064 | B1 * | 1/2006 | Loukas | H01F 27/2847 336/234 |
| 7,701,317 | B2 * | 4/2010 | Sullivan | H01F 41/061 336/225 |
| 2005/0040093 | A1 * | 2/2005 | Yanagisawa | H02M 1/126 210/243 |
| 2012/0105190 | A1 | 5/2012 | Mitani et al. | |
| 2012/0280776 | A1 * | 11/2012 | Hashimoto | H01F 17/04 336/83 |
| 2013/0008890 | A1 * | 1/2013 | Esaki | H01F 27/323 219/647 |
| 2013/0069754 | A1 * | 3/2013 | Yamamoto | H01F 27/2847 336/207 |
| 2014/0062635 | A1 | 3/2014 | Delanoe et al. | |
| 2015/0325361 | A1 * | 11/2015 | Zajc | H01F 27/2847 29/605 |
| 2017/0213635 | A1 | 7/2017 | Bertels | |
| 2017/0221625 | A1 | 8/2017 | Sullivan et al. | |
| 2017/0323718 | A1 | 11/2017 | Foley | |
| 2018/0190422 | A1 | 7/2018 | Kwon et al. | |

FOREIGN PATENT DOCUMENTS

| | | | | |
|---|---|---|---|---|
| DE | 1438461 | B2 | 2/1970 | |
| DE | 4326583 | A1 * | 3/1994 | H01F 27/2847 |
| DE | 69825047 | T2 | 8/2005 | |
| FR | 2418532 | A1 | 9/1979 | |
| JP | H05135971 | A | 6/1993 | |
| JP | 3019334 | U | 12/1995 | |
| JP | H0998045 | A | 4/1997 | |
| JP | 2005102167 | A | 4/2005 | |
| JP | 2005160058 | A | 6/2005 | |
| JP | 2005192035 | A | 7/2005 | |
| JP | 2005318263 | A | 11/2005 | |
| JP | 2006158024 | A | 6/2006 | |
| JP | 2007088559 | A | 4/2007 | |
| JP | 2015204406 | A | 11/2015 | |
| JP | 2016039322 | A | 3/2016 | |
| WO | 2016022966 | A1 | 2/2016 | |

* cited by examiner

COIL ELEMENT

This patent application is a national phase filing under section 371 of PCT/EP2021/061659, filed May 4, 2021, which claims the priority of German patent application 102020114516.0, filed May 29, 2020, each of which is incorporated herein by reference in its entirety.

TECHNICAL FIELD

A coil element is specified.

BACKGROUND

In the case of coils and chokes, for example in power converters, the AC losses due to increasing clock frequencies constitute more and more the factor determining the design. Due to the AC winding losses, optimization options are limited for high power and simultaneously high frequencies. Up to now, stranded wires or copper flat wires have mostly been used for such applications.

SUMMARY

Embodiments provide a coil element.

According to at least one embodiment, a coil element comprises at least one core element and at least one winding body. In particular, the coil element may comprise at least a first core element and at least a first winding body.

According to a further embodiment, the first winding body comprises a first film conductor element. The first film conductor element comprises a plurality of conductor films stacked on top of each other. In particular, the first film conductor element may comprise at least 10 or preferably at least 20 or particularly preferably at least 50 conductor films. For example, the first film conductor element comprises 100 stacked conductor films. The arrangement direction of the conductor films one above the other can also be referred to as the stacking direction. Thus, the conductor films of the first film conductor element are arranged one above the other along the stacking direction. Each of the conductor films may be tape-shaped and comprise a length, a width and a thickness. The length is particularly preferably greater than the width, while the width is particularly preferably greater than the thickness. The stacking direction is oriented perpendicular to the length and to the width and parallel to the direction of the thickness, so that the first film conductor element comprises a height in the stacking direction which is at least equal to the sum of the thicknesses of all conductor films. Particularly preferably, each of the conductor films comprises or is formed from a metallic tape, especially preferably with or of copper.

According to a further embodiment, the first core element comprises a winding carrier part. The first winding body is arranged around the winding carrier part and comprises a winding axis. In other words, the first film conductor element is wound around the winding carrier part of the first core element, thereby defining the winding axis. Here and in the following, a direction along the winding axis may also be referred to as a vertical axis. Directions perpendicular to the winding axis may also be referred to as horizontal directions. In particular, the first winding body is arranged in a spiral configuration with a plurality of windings of the first film conductor element around the winding axis. In other words, the first winding body comprises a plurality of windings of the first film conductor element around the winding axis in the manner of a spiral. Each turn of the first film conductor element around the winding carrier part can form a winding in this case.

According to a further embodiment, the stacking direction is parallel to the winding axis. In other words, the conductor films are arranged on top of each other along the direction of the winding axis and thus in vertical direction. Accordingly, the direction specified by the thickness of the conductor films is parallel to the winding axis. The conductor films run in horizontal planes, which are parallel to the length and width of the conductor films, in a spiral around the winding axis. The longitudinal direction of the film conductors and thus the longitudinal direction of the first film conductor element thus runs spirally around the winding axis and thus around the winding carrier part. The described embodiment and arrangement of the first film conductor element allows it to be placed right into the corners of the winding chamber provided for the first winding body in the first core element. The winding carrier part is arranged in the center of the spirally wound first film conductor element and can also be referred to as the so-called slug of the core element.

Particularly preferably, the winding carrier part comprises a greater height than the first film conductor element in the vertical direction, i.e. in a direction parallel to the winding axis. Furthermore, the winding carrier part can be adjacent to an air gap in the vertical direction. By leaving free the region adjacent to the air gap, which can also be referred to as the center region in the mirror-symmetrical arrangement described further below with a second core element and a second winding body, the stray field at the air gap can be reduced or even avoided.

Furthermore, the conductor films of the first film conductor element are electrically insulated from each other. For this purpose, an electrically insulating material can be arranged between the conductor films. Particularly preferably, the electrically insulating material has a smaller thickness than the conductor films, for example a thickness smaller by a factor of 10 or more. The electrically insulating material can, for example, be formed by electrically insulating plastic film tapes arranged alternately with the conductor films one above the other. Furthermore, the conductor films can be partially or completely formed with an electrically insulating plastic material in the width and thickness direction. For this purpose, the conductor films can be coated with an electrically insulating plastic varnish, for example. The stacked conductor films of the first film conductor element are preferably connected in parallel.

According to a further embodiment, a magnetic material is arranged between windings of the first winding element. Particularly preferably, the magnetic material is arranged between directly adjacent windings. Preferably, the magnetic material comprises a magnetic permeability that is smaller than or equal to a magnetic permeability of the first core element. Particularly preferably, the magnetic material comprises a magnetic permeability of greater than or equal to 10 and less than or equal to 100.

For example, the magnetic material is formed by a magnetic strip, which may also be referred to as a magnetic tape, wound around the winding carrier part together with the first film conductor element. The magnetic tape may comprise, for example, a plastic material forming a carrier material in and/or on which ferrite and/or iron-based particles, powder grains and/or nanocrystallites are arranged. Furthermore, the first film conductor element may be embedded in the magnetic material. For example, a magnetic varnish, for example formed by a plastic material in which ferrite- and/or iron-based particles, powder grains and/or nanocrystallites are contained, can be used for this purpose. The first film conductor element may comprise side surfaces parallel to the stacking direction and, in particular, perpendicular to the width direction, to which the magnetic material is applied. Alternatively or additionally, the first core element may comprise a ridge-shaped portion that forms the magnetic material and that is arranged between the windings of the first film conductor element. In other words, the first core element may comprise a channel spirally extending around the winding carrier part, in which the first film conductor element is arranged, preferably fully recessed.

According to a further embodiment, the magnetic material comprises a height along the stacking direction and thus in the vertical direction that is greater than or equal to the height of the first film conductor element. Particularly preferably, the magnetic material comprises a height in the vertical direction that is greater than the height of the first film conductor element in the vertical direction. In other words, the magnetic material may be higher in the vertical direction than the first film conductor element and thus may overtop the first film conductor element in the vertical direction.

According to a further embodiment, the first core element comprises a magnetic core material. For example, the first core element comprises a ferrite-based magnetic material. Alternatively or additionally, the core element may comprise or be a magnetic material based on one or more materials selected from Ni—Fe—Mo, Ni—Fe, Fe—Si—Al, and Fe—Si. For example, the core element comprises or is made of Fe—Si—Al with a Fe:Si:Al mixing ratio of 85:9:6. Such a material, also known as Sendust, is a soft magnetic material that comprises high magnetic permeability, low magnetic loss, and good temperature stability. Furthermore, the core element may comprise Fe—Si with a Si admixture of 6.5%. Such a material, also known as Mega Flux, is characterized inter alia by a higher flux density and a high temperature stability compared to the other materials. The magnetic material for the first core element can be produced, for example, in powder form and shaped by sintering into the desired form for the core element.

The first core element may comprise or be, for example, a cup core or an E-core. Further, other or related core shapes are also possible, for example, a planar core or an ER core. Furthermore, the coil element may comprise, for example, a further core element, which may be, for example, an I-core or a disk-shaped core element, and which may be arranged on the first core element in such a way that it can form a magnetic circuit together with the first core element.

Particularly preferably, the coil element comprises a second core element and a second winding body in addition to the first core element and the first winding body. The embodiments and features described above for the first core element and the first winding body apply equally to the second core element and the second winding body. Thus, the second winding body may comprise, in particular, a second film conductor element that comprises one or more of the features described for the first film conductor element. Furthermore, a magnetic material may be arranged between windings of the second winding body, which may comprise one or more features of the magnetic material described in connection with the first core element and the first winding body. Particularly preferably, the first and second core elements may be formed identically. Further, particularly preferably, the first and second winding bodies may be formed the same. Preferably, the first and second winding bodies are connected in series with each other.

The second core element with the second winding body may be arranged on the first core element with the first winding body. In particular, the two core elements may be arranged on top of each other such that the first and second winding bodies are arranged facing each other. Particularly preferably, the second core element with the second winding body can be arranged in mirror symmetry on the first core element with the first winding body.

In the coil element described here, according to a particularly preferred embodiment, in particular at least one film conductor element is used in conjunction with a core element, i.e. at least one stack with a plurality of conductor films which are joined together in the thickness direction electrically insulated from one another, wherein, particularly preferred, the conductor films can be connected in parallel with one another. The film conductor element is wound around a winding carrier part of the core element around a winding axis parallel to the stacking direction. in In such arrangement, such conductor element can be placed right into to the corners of the winding chamber in the core element. The additional use of a magnetic material, such as magnetic tape, wound around the winding carrier part in parallel with the film conductor element, as described above, can improve the magnetic field guidance. As previously described, as an alternative to a magnetic tape, the film conductor element may be embedded in the magnetic material or a separate magnetic material, which may for example be formed by a spiral ridge of the core element, may be placed between the windings as a field guide. Other particularly preferred features may include, as described further above, leaving a center region at an air gap free to reduce or avoid the stray field at the air gap, and the possibility of using core element shapes such as a cup core or E core.

Particularly preferably, the coil element according to at least some embodiments may make it possible to reduce losses with moderate technical effort compared to conventional coil designs with substantially the same dimensioning. In the coil element described herein, particularly preferably, AC losses can be significantly reduced compared to conventional coil technologies. This can also enable use at higher frequencies than known coils.

BRIEF DESCRIPTION OF THE DRAWINGS

Further advantages, advantageous embodiments and further developments are revealed by the embodiments described below in connection with the figures, in which.

DETAILED DESCRIPTION OF ILLUSTRATIVE EMBODIMENTS

Figure 1A:
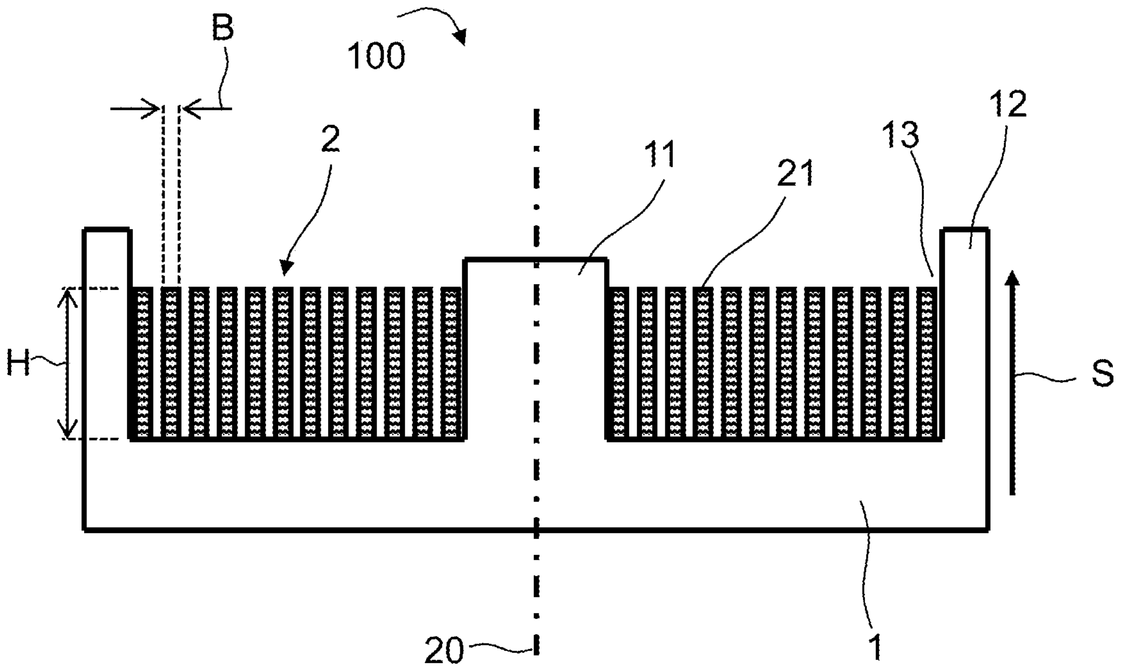
FIGS. 1A-1C show schematic illustrations of a coil element according to an exemplary embodiment.

In the embodiments and figures, identical, similar or identically acting elements are provided in each case with the same reference numerals. The elements illustrated and their size ratios to one another should not be regarded as being to scale, but rather individual elements, such as for example layers, components, devices and regions, may have been made exaggeratedly large to illustrate them better and/or to aid comprehension.

Figure 1B:
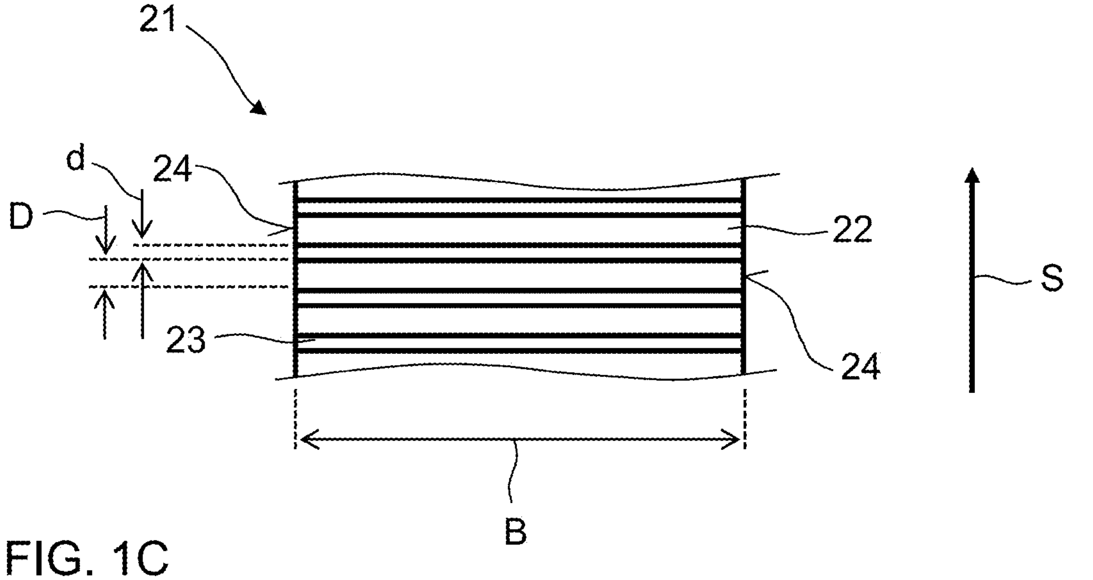
Figure 1C:
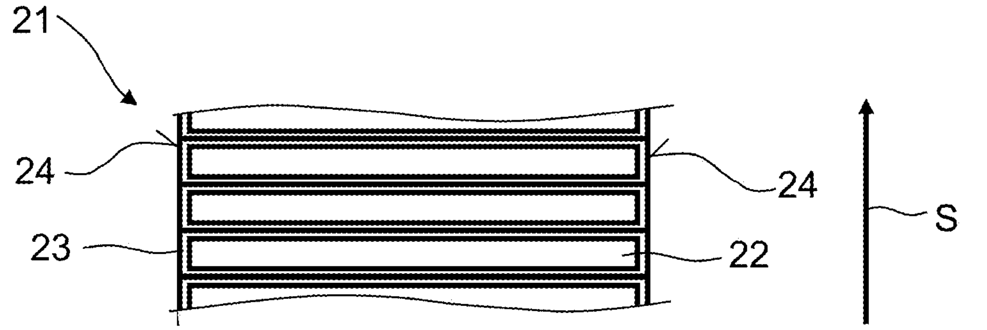

In connection with FIGS. 1A to 1C a coil element 100 is shown with a core element 1 and a winding body 2. With respect to the following exemplary embodiments, the core element 1 and the winding body 2 are referred to as the first core element 1 and the first winding body 2, respectively. In FIG. 1A, a schematic sectional view of the coil element 100 is shown. The first winding body 2 comprises a first film conductor element 21. In FIG. 1B, a schematic view of a section of the first film conductor element 21 is shown. In FIG. 1C, a schematic illustration of a section of the first film conductor element 21 is shown according to an alternative exemplary embodiment. Unless otherwise specified, the following description refers equally to FIGS. 1A to 1C.

The first film conductor element 21 comprises a plurality of conductor films 22 stacked on top of each other, as can be seen in FIGS. 1B and 1C. In particular, the first film conductor element 21 may comprise at least 10 or preferably at least 20 or particularly preferably at least 50 conductor films 22. In a particularly preferred exemplary embodiment, the first film conductor element 21 comprises, for example, 100 stacked conductor films 22. The arrangement direction of the conductor films on top of each other is referred to as the stacking direction S and is indicated in FIGS. 1A to 1C, respectively.

Each of the conductor films 22 of the first film conductor element 21 is formed in a tape shape and comprises a width B perpendicular to the stacking direction S and a thickness D parallel to the stacking direction S, as indicated in FIG. 1B. Further, each of the conductor films 22 comprises a length along a longitudinal direction perpendicular to the width B and the thickness D, which respectively indicates the greatest extent of the conductor films 22. The length is thus greater than the width B, which in turn is greater than the thickness D. In the exemplary embodiment shown, each of the conductor films 22 is formed by a copper tape. Alternatively, other metallic materials are also possible.

The conductor films 22 of the first film conductor element 21 are arranged electrically insulated from one another. For this purpose, an electrically insulating material 23 is arranged between the conductor films 22, which particularly preferably comprises a thickness d which is smaller than the thickness D of the conductor films 22. For example, $D/d \leq 10$. The electrically insulating material 23 can, for example, be formed by electrically insulating plastic film tapes arranged alternately with the conductor films 22 one above the other.

For manufacturing the first film conductor element 21, copper films and plastic films can, for example, be alternately stacked on top of each other and fixated or laminated and, if necessary, cut into a desired shape. Furthermore, it is also possible, for example, to roll up a copper film and a plastic film with a number of windings corresponding to the desired number of layers on a roll, to fix them and to cut them in such a way that a flat stack can be produced when removing them from the roll. Three-dimensional printing processes are also conceivable. As indicated in FIG. 1C, the conductor films 22 can also each be coated, for example, with an electrically insulating plastic varnish as an electrically insulating material 23 and stacked one on top of the other.

The first film conductor element 21 comprises a height H, indicated in FIG. 1A, which is at least equal to the sum of the thicknesses D of all conductor films 22 and, in particular, the sum of the thicknesses D and d of the conductor films 22 and the electrically insulating material 23 therebetween. For example, in the case of an electrically insulating varnish as the electrically insulating material 23, the thickness d of the electrically insulating material may also be negligible compared to the thickness D of the conductor films 22. The width B of the first film conductor element 21 substantially corresponds to the width B of the conductor films 22. As indicated in FIGS. 1B and 1C, the first film conductor element 21 is bounded in the width direction by side surfaces 24, which may be covered with the electrically insulating material 23, depending on the manufacturing process, as indicated in FIG. 1C.

For example, 100 conductor films 22 can be used for the first film conductor element 21, each of which comprises a thickness of 150 μm and a width in the range of 1 to 2 mm in the first film conductor element 21, so that in this case the first film conductor element 21 can have, for example, a height of about 15 mm and an aforementioned width. Alternatively, larger and smaller dimensions are also possible, depending on the application. In particular, the described coil element may distinguish itself by the fact that the dimensions of the individual components are easily scalable and not restricted to specific sizes.

The stacked conductor films 22 of the first film conductor element 21 are interconnected in parallel with each other at the beginning and at the end in the longitudinal direction, wherein such interconnections as well as electrical connections are not shown for the sake of clarity.

The first core element 1 may comprise or be, for example, a cup core or an E-core. Alternatively, other or related core forms are also possible, for example a planar core or an ER core. In addition, the coil element 100 may comprise, for example, a further core element, which may be, for example, an I-core or disc-shaped core element, and which may be arranged on the first core element 1 such that it may form a magnetic circuit together with the first core element 1.

For example, the first core element 1 comprises a ferrite-based magnetic material. Furthermore, other materials, for example based on one or more selected from Ni—Fe—Mo, Ni—Fe, Fe—Si—Al and Fe—Si, are also possible. For example, the core element 1 comprises or is made of the material Sendust or Mega Flux described in the general part.

The first core element 1 comprises a winding carrier part 11. The first winding body 2 is arranged around the winding carrier part 11 and comprises a winding axis 20 indicated in FIG. 1A. The first film conductor element 21 is wound around the winding carrier part 11 of the first core element 1 in the manner of a spiral, thereby defining the winding axis 20. The winding carrier part 11 is thus arranged in the center of the spirally wound first film conductor element 21, and may also be referred to as a so-called slug of the core element 1. A direction along the winding axis 20 may also be referred to as a vertical axis. Directions perpendicular to the winding axis 20 may also be referred to as horizontal directions. Thus, in a section corresponding to a horizontal sectional plane through the first winding body 2, it would be seen that the first winding body 2 is arranged in the manner of a spiral with a plurality of windings of the first film conductor element 21 around the winding axis 20. Accordingly, the first winding body 2 comprises a plurality of windings of the first film conductor element 21 around the winding axis 20 in a spiral fashion. Each turn of the first film conductor element 21 around the winding carrier part 11 forms a winding. In the sectional view of FIG. 1A, the adjacent windings are shown spaced apart for clarity. Alternatively, the windings can also be arranged directly next to each other. This may be possible, in particular, if the side surfaces 24 of the first film conductor element 21 are covered with an electrically insulating material. Alternatively, it may also be possible to wind an electrically insulating film around the winding carrier part 11 together with the first film conductor element 21 so that adjacent windings are electrically separated from each other by the electrically insulating film.

As can be seen in FIG. 1A, the stacking direction S is parallel to the winding axis 20. In other words, the conductor films 22 are arranged one above the other along the direction of the winding axis 20 and thus in a vertical direction. Thus, the direction specified by the thickness D of the conductor films 22 is parallel to the winding axis 20. The conductor films 22 extend spirally around the winding axis 20 in horizontal planes that are parallel to the length and the width of the conductor films 22.

The first core element 1 further comprises an edge portion 12 which, together with the winding carrier part 11, defines a winding chamber 13 in which the first winding body 2 is arranged. Depending on the design of the first core element 1, for example as a cup core or E-core, the edge portion 12 can completely or at least partially surround the first winding body 2 in a horizontal plane. Due to the described embodiment and arrangement of the first film conductor element 21, this can be placed up to the corners of the winding chamber 13 provided for the first winding body 2 in the first core element 1.

As further indicated in FIG. 1A, the winding carrier part 11 may comprise a greater height in the vertical direction, i.e., in a direction parallel to the winding axis 20, than the first film conductor element 21 and thus than the first winding body 2. Further, the winding carrier part 11 may comprise a smaller height in the vertical direction than the edge portion 12. Thus, if the first core element 1 is covered by another core element, an air gap can be formed in the vertical direction above the winding carrier part 11. By leaving the region of the winding carrier part 11 adjacent to the air gap free, it may be possible, depending on the geometry, to reduce or even avoid the stray field at the air gap.

Figure 2:
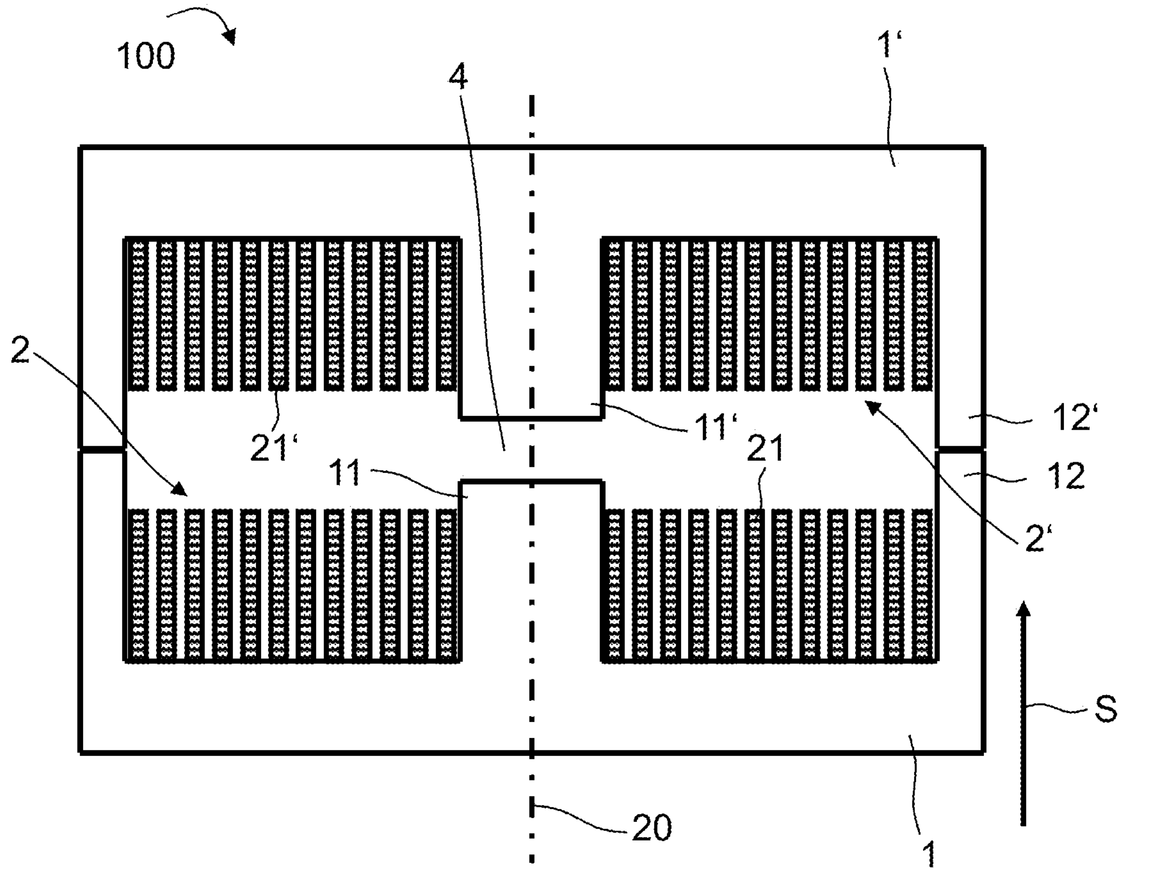
FIG. 2 shows a schematic illustration of a coil element according to a further exemplary embodiment.

FIG. 2 shows another exemplary embodiment for a coil element 100, which comprises a second core element 1' and a second winding body 2' in addition to the first core element 1 and the first winding body 2. The features described above for the first core element 1 and the first winding body 2 apply equally to the second core element 1' and the second winding body 2'. Particularly preferably, the first and second core elements 1, 1' can be embodied similarly as shown. Accordingly, the second winding body 2' comprises a second film conductor element 21' formed like the first film conductor element 21. The first and second winding bodies 2, 2' and thus the first and second film conductor elements 21, 21' are preferably connected in series with one another.

The second core element 1' with the second winding body 2' is arranged on the first core element 1 with the first winding body 2 such that the first and second winding bodies 2, 2' are arranged facing each other. As can be easily seen, the second core element 1' with the second winding body 2' is arranged mirror-symmetrically along the stacking direction S on the first core element 1 with the first winding body 2, wherein the edge parts 12, 12' of the first and second core elements 1, 1' can rest on each other.

An air gap 4 is formed between the winding carrier parts 11, 11' of the first and second core elements 1, 1' due to the lower height of the winding carrier parts 11, 11' compared to the respective edge parts 12, 12'. Due to the fact that the winding bodies 2, 2' further comprise a lower height than the winding carrier parts 11, 11', each winding carrier part 11, 11' has a region left free. As described in connection with the previous exemplary embodiment, by leaving free the region of the winding carrier parts 11, 11' adjacent to the air gap 4, respectively, which may also be referred to as the center region, the stray field at the air gap 4 can be reduced or even avoided.

Figure 3A:
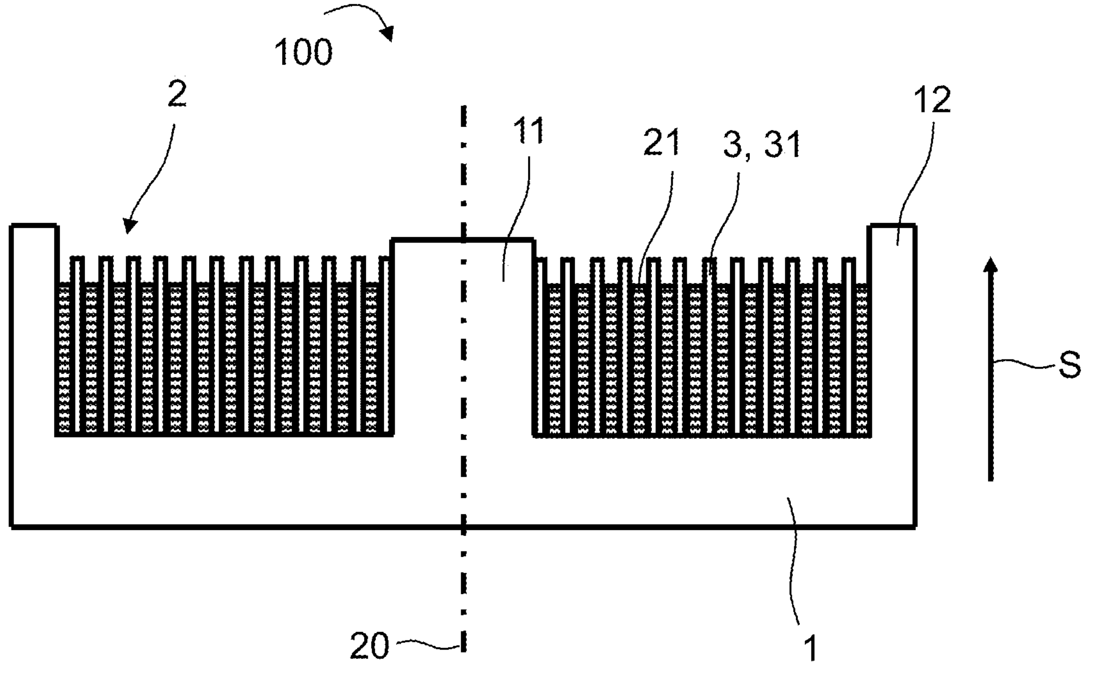
FIGS. 3A and 3B show schematic illustrations of a coil element according to a further exemplary embodiment.
Figure 3B:
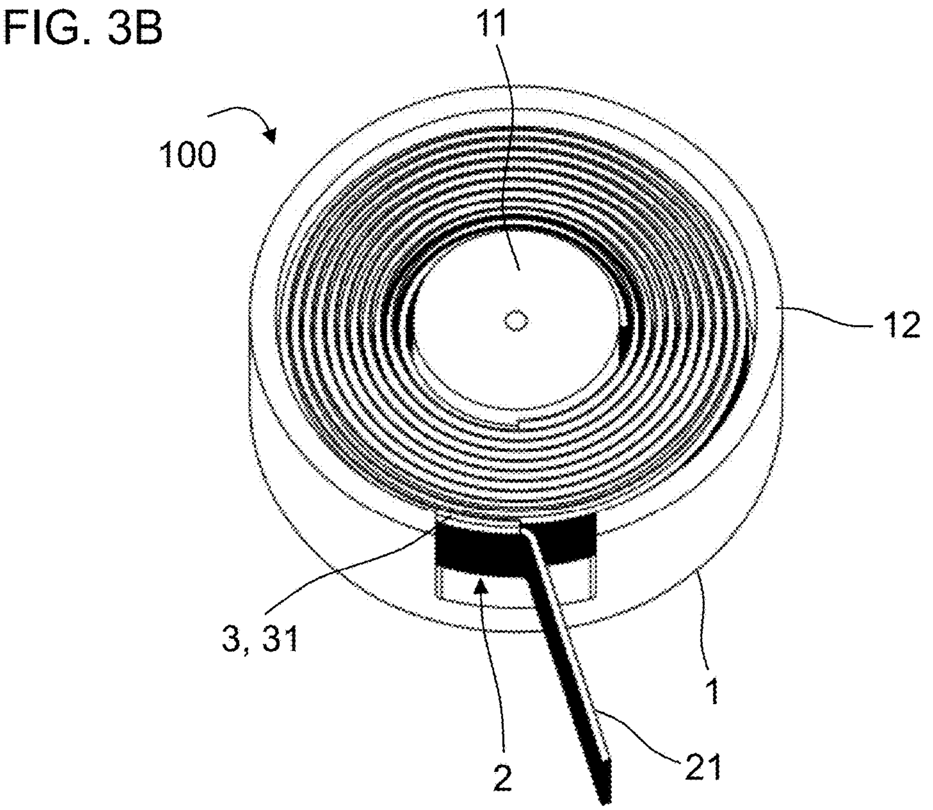
Figure 4A:
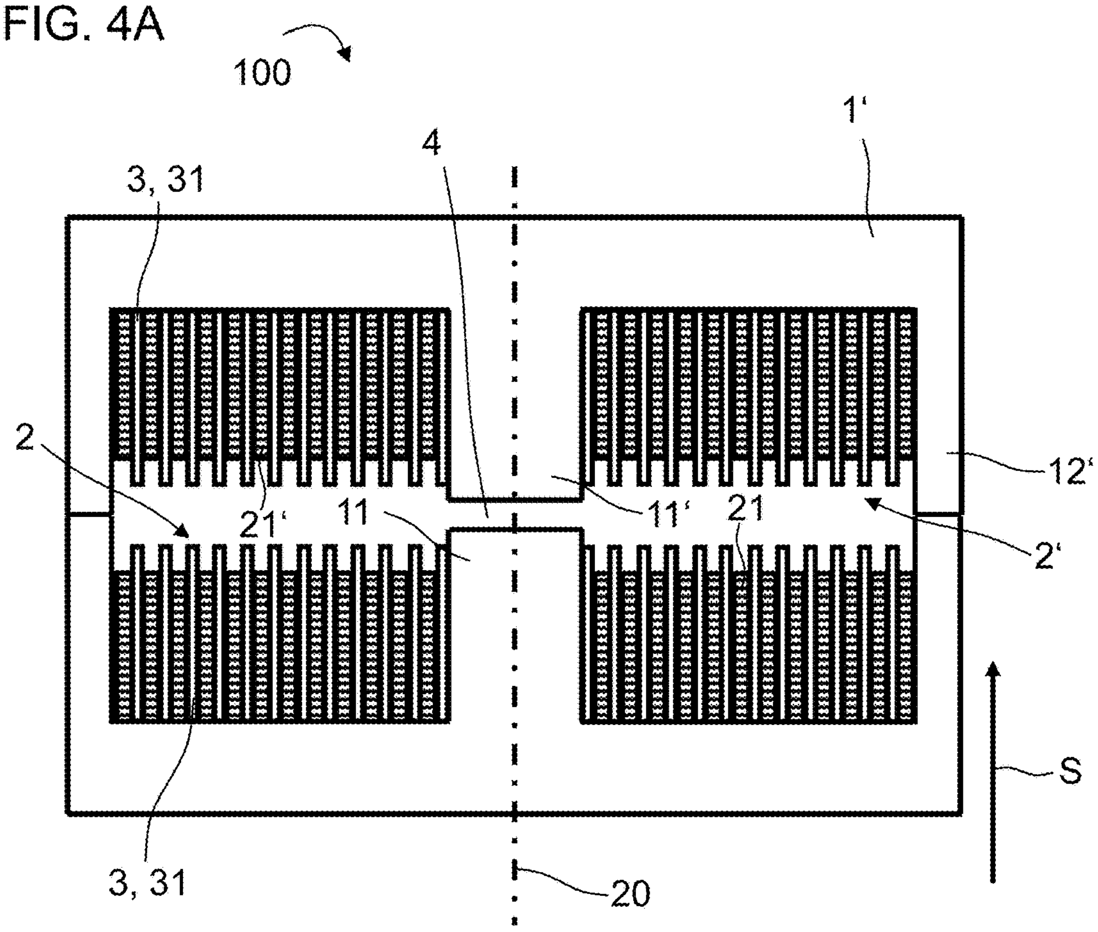
FIGS. 4A and 4B show schematic illustrations of a coil element according to a further exemplary embodiment.
Figure 4B:
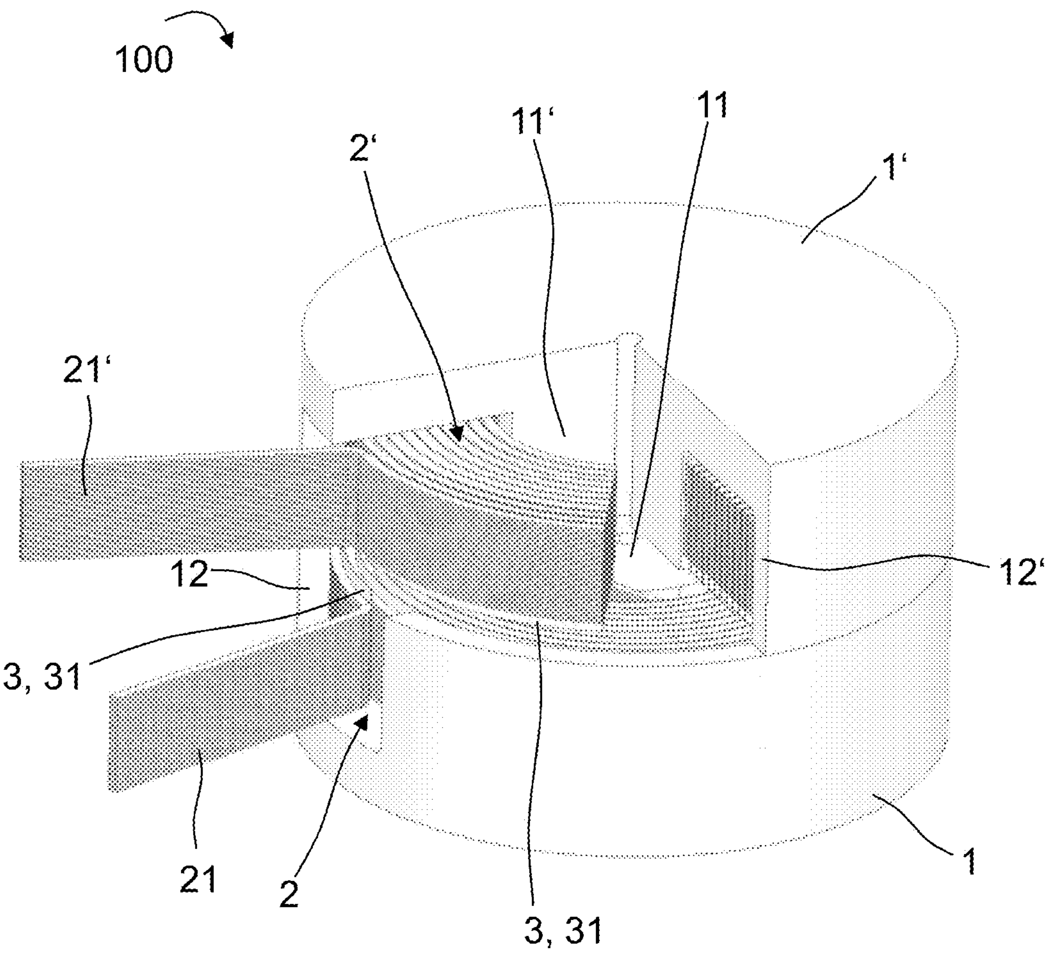

In FIGS. 3A and 3B and in FIGS. 4A and 4B, respectively, in a sectional view and a three-dimensional view, which is cut open in FIG. 4B for better comprehensibility, further exemplary embodiments for the coil element 100 are shown, which represent modifications of the exemplary embodiments shown in connection with FIGS. 1A to 1C and with FIG. 2. Purely by way of example, the core elements in FIGS. 3A to 4B are cup cores. Alternatively, as described above, other core shapes are also possible.

Compared to the previous exemplary embodiments, in the exemplary embodiments shown in FIGS. 3A and 3B and FIGS. 4A and 4B, a magnetic material 3 is arranged between windings of the first winding body 2 and the first and second winding bodies 2, 2', respectively. Particularly preferably, as shown, the magnetic material 3 is arranged between directly adjacent windings. Preferably, the magnetic material 3 comprises a magnetic permeability that is smaller than or equal to a magnetic permeability of the first core element 1 or of the first and second core elements 1, 1', respectively. Particularly preferably, the magnetic material 3 comprises a magnetic permeability of greater than or equal to 10 and less than or equal to 100.

In the exemplary embodiments shown in FIGS. 3A to 4B, the magnetic material 3 is formed in each case by a magnetic tape 31, which may also be referred to as a magnetic tape, which is wound around the respective winding carrier part 11, 11' together with the respective film conductor element 21, 21'. The magnetic tape 31 may comprise, for example, a plastic material forming a plastic carrier in and/or on which ferrite and/or iron-based particles, powder grains and/or nanocrystallites are embedded or arranged.

In the vertical direction, i.e. along the stacking direction S, the magnetic material 3 comprises a height which is greater than or equal to the height of the respective film conductor element 21, 21'. Particularly preferably, the magnetic material 3 comprises a height in the vertical direction which is greater than the height of the respective film conductor element 21, 21' in the vertical direction, so that the magnetic material 3 is higher in the vertical direction than the respective film conductor element 21, 21' and thus protrudes above the film conductor element 21, 21' in the vertical direction.

By using the magnetic material 3 parallel to the windings of the respective film conductor element 21, 21', the field guidance can be improved. It could be shown by simulations that, for example, the coil element 100 shown in FIG. 4 comprises significantly lower AC winding losses compared to a conventional coil design with corresponding core elements and dimensions using common strand-based winding bodies which do not allow the use of magnetic material between the windings.

As indicated in FIGS. 3B and 4B, a portion of each of a film conductor element 21, 21' that is led outwardly through an opening in the respective core element 1, 1' may form an electrical connection. Alternatively, other electrical connections may be provided.

Figure 5:
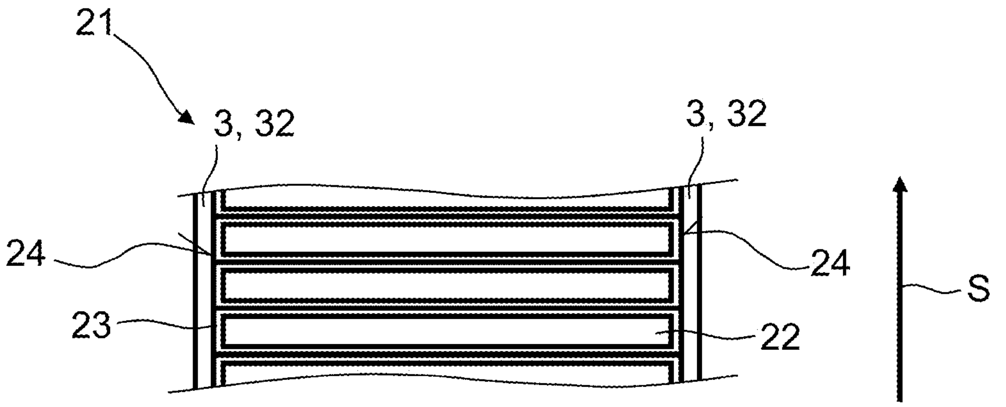
FIG. 5 shows a schematic illustration of a section of a film conductor element of a coil element according to a further exemplary embodiment.

As an alternative to a magnetic tape as magnetic material 3, the first film conductor element 21 and the first and second film conductor elements 21, 21', respectively, may be embedded in the magnetic material 3. As shown in FIG. 5 by way of example using a section of the first film conductor element 21, a magnetic varnish 32, for example formed by a plastic material in which ferrite and/or iron-based particles, powder grains and/or nanocrystallites are contained, can be used for this purpose. The magnetic material 3 may preferably be applied for this purpose to the side surfaces 24 prior to winding onto the winding carrier part of the core element.

Figure 6:
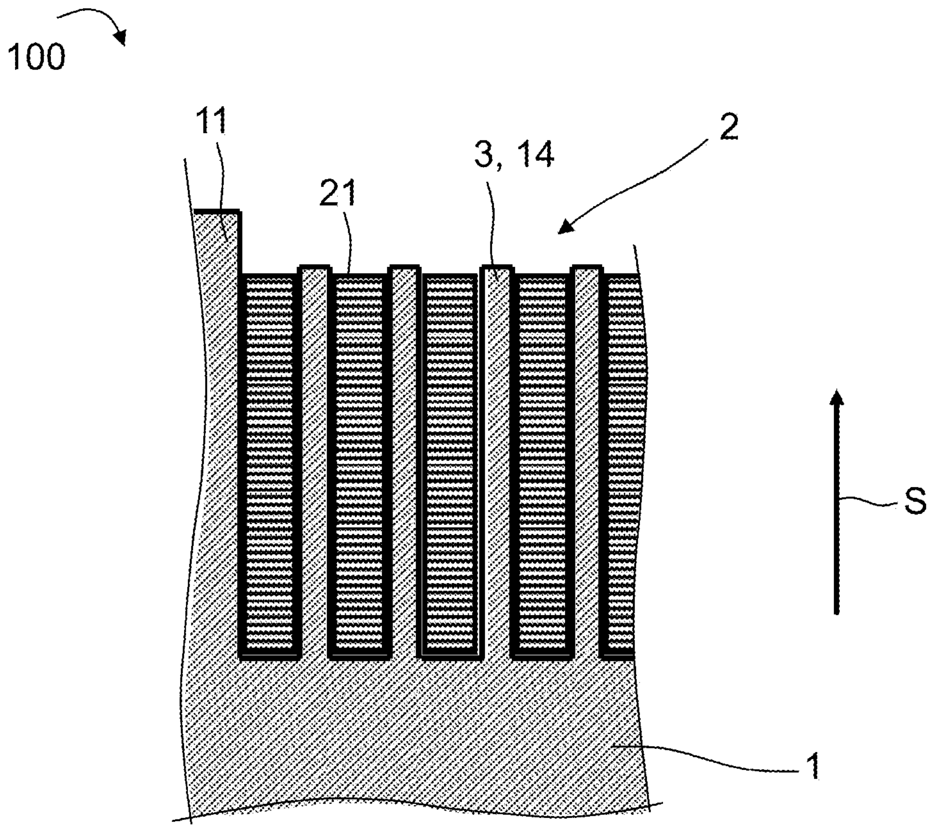
FIG. 6 shows a schematic illustration of a section of a coil element according to a further exemplary embodiment.

As shown in a section of the first core element 1 with the first winding body 2 in FIG. 6, the first core element 1 according to a further exemplary embodiment may also comprise a ridge-shaped portion 14 forming the magnetic material 3, which is arranged between the windings of the first film conductor element 21. In other words, the first core element 1 may comprise a channel extending spirally around the winding carrier part 11, in which the first film conductor element 21 is preferably arranged completely recessed. In the case of a coil element 100 with a second core element 1', as shown in FIGS. 4A and 4B, the second core element 1' may comprise a corresponding ridge-shaped portion and thus a corresponding spiral-shaped channel in which the second film conductor element is arranged.

The features and embodiments described in connection with the figures may be combined with each other according to further exemplary embodiments, although not all combinations are explicitly described. Furthermore, the exemplary embodiments described in connection with the figures may alternatively or additionally comprise further features according to the description in the general part.

The invention is not limited to the exemplary embodiments by the description based thereon. Rather, the invention encompasses any new feature as well as any combination of features, which in particular includes any combination of features in the patent claims, even if this feature or combination itself is not explicitly specified in the patent claims or exemplary embodiments.

The invention claimed is:

1. A coil element comprising:

a first core element; and a first winding body arranged around a winding carrier part of the first core element with a winding axis, wherein the first winding body comprises a first film conductor element and the first film conductor element comprises a plurality of conductor films stacked on top of each other along a stacking direction and electrically insulated from each other by an electrically insulating material, wherein the stacking direction is parallel to the winding axis, wherein the first winding body comprises a plurality of windings of the first film conductor element that spiral around the winding axis, and wherein distances of the plurality of windings from the winding axis increase based on a curving of the plurality of windings around the winding axis.

2. The coil element according to claim 1, wherein the electrically insulating material is arranged in the stacking direction between the conductor films and comprises a smaller thickness along the stacking direction than the conductor films.

3. The coil element according to claim 1, wherein each conductor film comprises a metallic tape.

4. The coil element according to claim 1, wherein the stacked conductor films of the first film conductor element are interconnected in parallel.

5. The coil element according to claim 1, further comprising a magnetic material arranged between windings of the first winding body.

6. The coil element according to claim 5, wherein the magnetic material comprises a magnetic permeability which is smaller than or equal to a magnetic permeability of the first core element.

7. The coil element according to claim 5, wherein the magnetic material comprises a magnetic permeability of greater than or equal to 10 and less than or equal to 100.

8. The coil element according to claim 5, wherein the magnetic material comprises a height along the stacking direction that is greater than a height of the first film conductor element along the stacking direction.

9. The coil element according to claim 5, wherein the magnetic material is formed by a magnetic tape wound around the winding carrier part together with the first film conductor element.

10. The coil element according to claim 5, wherein the first film conductor element is embedded in the magnetic material.

11. The coil element according to claim 10, wherein the first film conductor element comprises side surfaces parallel to the stacking direction and the magnetic material is located at side surfaces of the first film conductor element.

12. The coil element according to claim 5, wherein the first core element comprises a ridge-shaped part forming the magnetic material arranged between the windings of the first film conductor element.

13. The coil element according to claim 1, wherein the first core element comprises a cup core or an E core.

14. The coil element according to claim 1, wherein the coil element comprises a second core element and a second winding body, and wherein the first and second winding bodies are connected in series with each other.

15. The coil element according to claim 14, wherein the second core element with the second winding body is arranged mirror-symmetrically on the first core element with the first winding body.

16. The coil element according to claim 14, wherein the first and second core elements are identical and the first and second winding bodies are identical.

* * * * *